United States Patent
Kim et al.

(10) Patent No.: US 10,274,991 B2
(45) Date of Patent: Apr. 30, 2019

(54) APPARATUS AND METHOD FOR PROVIDING TOUCH INPUTS BY USING HUMAN BODY

(71) Applicant: Samsung Electronics Co., Ltd., Gyeonggi-do (KR)

(72) Inventors: Hyung-soon Kim, Gyeonggi-do (KR); So-young Kim, Gyeonggi-do (KR); Hyun-soo Choi, Seoul (KR); Joon-oo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 510 days.

(21) Appl. No.: 14/796,568

(22) Filed: Jul. 10, 2015

(65) Prior Publication Data

US 2016/0018944 A1    Jan. 21, 2016

(30) Foreign Application Priority Data

Jul. 15, 2014 (KR) .......................... 10-2014-0089276

(51) Int. Cl.
| | |
|---|---|
| *G06F 3/041* | (2006.01) |
| *G06F 1/16* | (2006.01) |
| *G06F 3/01* | (2006.01) |
| *G06F 3/0488* | (2013.01) |

(52) U.S. Cl.
CPC ............ *G06F 1/163* (2013.01); *G06F 1/169* (2013.01); *G06F 1/1626* (2013.01); *G06F 1/1694* (2013.01); *G06F 3/017* (2013.01); *G06F 3/04883* (2013.01); *G06F 3/04886* (2013.01)

(58) Field of Classification Search
CPC . G06F 3/01; G06F 3/011; G06F 3/016; G06F 3/0485
USPC .................................. 345/173, 174, 176; 1/1
See application file for complete search history.

(56) References Cited

U.S. PATENT DOCUMENTS

| | | | |
|---|---|---|---|
| 7,725,089 B2 | 5/2010 | Lee et al. | |
| 8,742,888 B2 | 6/2014 | Hyoung et al. | |
| 9,658,693 B2* | 5/2017 | Levesque ................ | G06F 3/016 |
| 2011/0069018 A1 | 3/2011 | Atkins et al. | |
| 2013/0257757 A1 | 10/2013 | Kim | |
| 2014/0062892 A1* | 3/2014 | Dickinson ............. | G06F 3/0412 |
| | | | 345/173 |

(Continued)

FOREIGN PATENT DOCUMENTS

| | | |
|---|---|---|
| KR | 10-0842250 | 6/2008 |
| KR | 10-2009-0037535 | 4/2009 |

(Continued)

*Primary Examiner* — Calvin C Ma
(74) *Attorney, Agent, or Firm* — The Farrell Law Firm, P.C.

(57) ABSTRACT

A touch input method, a terminal contacting a first body part, a non-transitory computer-readable storage medium, and a chipset are provided. The touch input method includes receiving, by a terminal contacting a first body part, a touch input applied by a second body part; measuring a distance between the terminal and the second body part; sensing, by the terminal, whether the second body part contacts the first body part; and determining input information for controlling the terminal, based on the measured distance between the terminal and the second body part and changed information of an electrical signal transmitted from the terminal to the first body part.

20 Claims, 17 Drawing Sheets

(56) References Cited

U.S. PATENT DOCUMENTS

2014/0344954 A1* 11/2014 Kim .................. G06F 3/0485
726/28
2015/0054730 A1* 2/2015 Kodama ................ G09G 3/001
345/156

FOREIGN PATENT DOCUMENTS

| KR | 10-2010-0047508 | 5/2010 |
| KR | 10-1227678 | 1/2013 |

* cited by examiner

APPARATUS AND METHOD FOR PROVIDING TOUCH INPUTS BY USING HUMAN BODY

PRIORITY

This application claims priority to a Korean Patent Application filed on Jul. 15, 2014 in the Korean Intellectual Property Office and assigned Serial No. 10-2014-0089276, the entire content of which is incorporated herein by reference.

BACKGROUND

1. Field of the Disclosure

The present disclosure relates generally to a method of providing touch inputs to a portable terminal by using a human body and a portable terminal apparatus using the same, and more particularly, to a method of providing touch inputs to a portable terminal by using a human body and measuring a distance between the touch inputs and the portable terminal, and a portable terminal apparatus using the same.

2. Description of the Related Art

User interfaces (UIs) denote apparatuses or software which may enable a user to smoothly use digital devices. Recently, smart functions such as Internet browsers, games, social networking service applications, and/or the like or other complex functions are installed in digital devices such as Blu-ray players, multimedia players, set-top boxes, and/or the like, and thus, it is required to enable a UI, which is used to manipulate a digital device, to receive various types of inputs. Therefore, graphic UIs (GUIs) are being used for quickly and intuitively transferring information to a user. A user using a device such as a keypad, a keyboard, a mouse, a touch screen, or the like may move a pointer displayed on a GUI to select an object with the pointer, thereby commanding a digital device to perform a desired operation.

Recently, with the miniaturization of digital devices, in addition to simply carrying a digital device, the frequency in which a digital device is worn on a human body is increasing. Digital devices worn on a human body in a band form, such as headbands, wristbands, ankle bands, and/or the like, are being developed. Also, digital devices which are wearable on a human body in the form of glasses or a watch are actively being developed. As the interest in such wearable devices increases, a method of manipulating a wearable device is actively being researched.

Wearable devices are devices which are attached to a human body, perform a computing operation, and include an application which performs some computing functions. Wearable devices are computing devices which are worn by users, and are becoming more popular, because wearable devices provide a new service which cannot be provided by existing devices. The use of wearable devices started in the military field and the industry field in the early 1990s. Since 2000, the coupling of wearable devices to smart devices has increased, and thus wearable devices have begun to be commercialized in the form of watches, accessories, or the like which are incorporated into users' daily lives.

Since wearable devices have been evolving for military and medical purposes over a long period of time, it is insufficient to provide conventional interfaces for general use. Therefore, for wearable devices, there is a need for a convenient and intuitive UI and an enhanced system for improving a user's experience.

SUMMARY

The present disclosure provides a method and an apparatus for extending a touch input part for a terminal by using a human body.

Additional aspects will be set forth in part in the description which follows and, in part, will be apparent from the description, or may be learned by practice of the presented exemplary embodiments.

In accordance with an aspect of the present disclosure, a touch input method is provided. The method includes receiving, by a terminal contacting a first body part, a touch input applied by a second body part; measuring a distance between the terminal and the second body part; sensing, by the terminal, whether the second body part contacts the first body part; and determining input information for controlling the terminal, based on the measured distance between the terminal and the second body part and changed information of an electrical signal transmitted from the terminal to the first body part.

Another aspect of the present disclosure provides that the distance between the terminal and the second body part may be a smallest distance from a side boundary of the terminal to the second body part.

Another aspect of the present disclosure provides that the sensing of whether the second body part contacts the first body part may include using swept frequency capacitive sensing.

Another aspect of the present disclosure provides that the sensing of whether the second body part contacts the first body part may include using conductivity of the body of the user.

Another aspect of the present disclosure provides that the sensing of whether the second body part contacts the first body part may include sensing for a certain time period after the terminal receives the touch input applied by the second body part.

Another aspect of the present disclosure provides that the touch input method may further include controlling a program which is being executed by the terminal, based on the input information for the terminal.

Another aspect of the present disclosure provides that the first body part and the second body part may be different body parts of the same user.

Another aspect of the present disclosure provides that the first body part may be a body part of a first user, the second body part may be a body part of a second user, and the first user may be in physical contact with the second user.

According to another aspect of the present disclosure, a terminal contacting a first body part is provided. The terminal includes an input unit configured to receive a touch input applied by a second body part; a distance measurement unit configured to measure a distance between the terminal and the second body part; a contact sensing unit configured to sense whether the second body part contacts the first body part; and a controller configured to determine input information for controlling the terminal, based on the measured distance between the terminal and the second body part and changed information of an electrical signal transmitted from the terminal to the first body part.

According to another aspect of the present disclosure, a non-transitory computer-readable storage medium storing a program, which when executed by a computer, performs a touch input method in connection with hardware is provided. The touch input method of the non-transitory computer-readable storage medium includes receiving, by a terminal contacting a first body part, a touch input applied by a second body part; measuring a distance between the terminal and the second body part; sensing, by the terminal, whether the second body part contacts the first body part; and determining input information for controlling the terminal, based on the measured distance between the terminal and the second body part and changed information of an electrical signal transmitted from the terminal to the first body part.

According to another aspect of the present disclosure, a chipset for touch input is provided. The chipset is configured to receive, by a terminal contacting a first body part, a touch input applied by a second body part; measure a distance between the terminal and the second body part; sense, by the terminal, whether the second body part contacts the first body part; and determine input information for controlling the terminal, based on the measured distance between the terminal and the second body part and changed information of an electrical signal transmitted from the terminal to the first body part.

BRIEF DESCRIPTION OF THE DRAWINGS

The above and/or other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
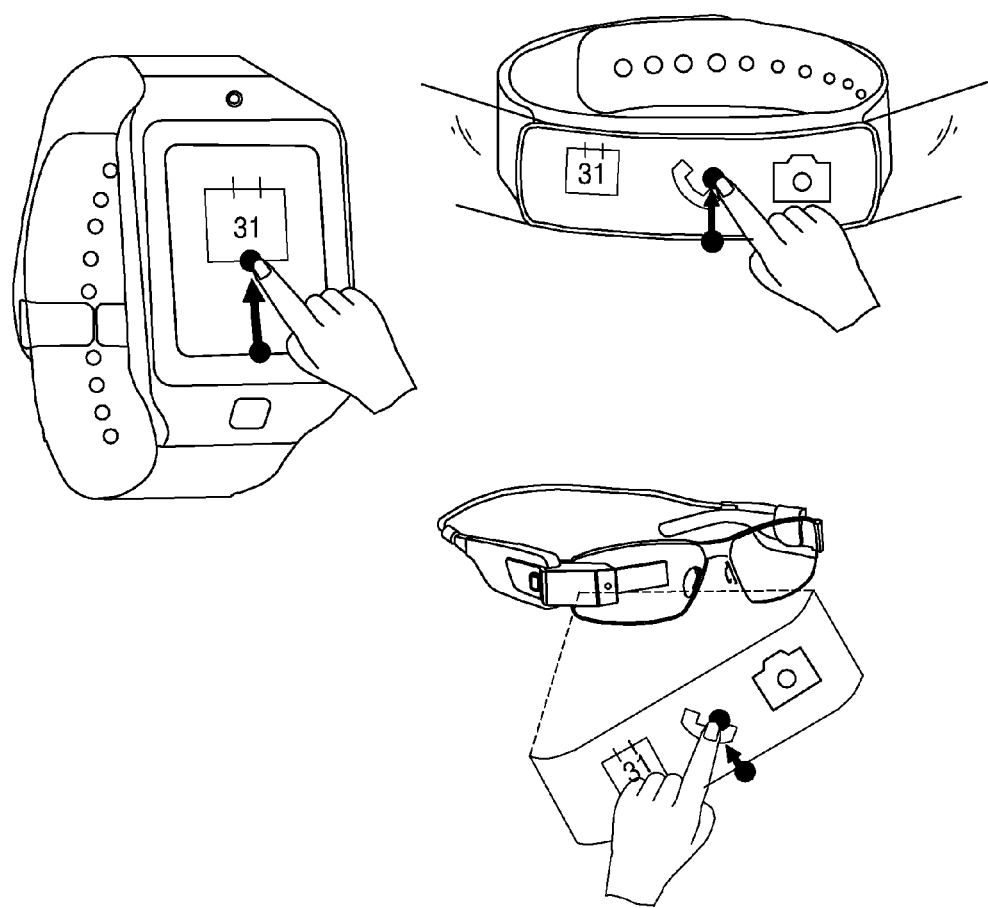
FIG. 1 is a diagram of wearable devices.

Reference will now be made in detail to embodiments of the present disclosure, examples of which are illustrated in the accompanying drawings, wherein like reference numerals refer to like elements throughout. In this regard, the present disclosure may have different forms and should not be construed as being limited to the descriptions set forth herein. Accordingly, the embodiments of the present disclosure are merely described below, by referring to the accompanying drawings, to explain aspects of the present description. As used herein, the term "and/or" includes any and all combinations of one or more of the associated listed items.

Hereinafter, embodiments of the present disclosure will be described in detail with reference to the accompanying drawings. In the accompanying drawings, like reference numerals refer to like elements, and the size and thickness of each element may be exaggerated for clarity and convenience of description.

FIG. 1 is a diagram of wearable devices.

Referring to FIG. 1, a wearable device may denote a device which is worn on and used by a user like a part of a human body. A wearable device according to an embodiment of the present disclosure may be implemented in various types. For example, examples of a wearable device described herein may include a smartwatch, a smart band, a head mounted display apparatus, glasses, clothes, and/or the like, but are not limited thereto.

A wearable device may include a UI that receives a user input. Examples of a user input may include at least one selected from a touch input, a bending input, a motion input, a voice input, a key input, and a multimodal input.

In the present disclosure, a touch input denotes a gesture that is applied to a touch screen by a user for controlling a wearable device. Also, in the present disclosure, the touch input may include an indirect input, for example, floating or hovering of a body part or an object over a touch screen such that the body part or object is spaced apart from the touch screen by a certain distance or more and is not touching the touch screen.

Examples of a touch input described herein may include a drag, a flick, a tap, a double tap, a swipe, a touch and hold, a drag and drop, a pinch to zoom, etc.

A drag denotes a motion where a user touches a screen with a finger or a touch tool and then moves the finger or the touch tool to another position of the screen while maintaining the touch.

A tap denotes a motion where a user touches a screen with a finger or a touch tool (for example, an electronic pen) and immediately lifts the finger or the touch tool without any movement.

A double tap denotes a motion where a user touches a screen twice with a finger or a touch tool (for example, a stylus).

A flick denotes a motion where a user touches a screen with a finger or a touch tool and then drags the finger or the touch tool at a threshold speed or more. The drag and the flick may be distinguished based on whether a movement speed of a finger or a touch tool is equal to or higher than the threshold speed, but in the present disclosure, a flick may be construed as being included in a drag.

A swipe (or a swype) denotes a motion where a user touches a certain region of a screen with a finger or a touch tool and moves the finger or the touch tool by a certain distance in a horizontal or vertical direction. A diagonal-direction movement may not be recognized as a swipe event. In the present disclosure, a swipe may be construed as being included in a drag.

A touch and hold denotes a motion where a user touches a screen with a finger or a touch tool (for example a stylus) and maintains a touch input for a threshold time or more. That is, a touch and hold denotes a case where a time difference between a touch-in time and a touch-out time is greater than or equal to the threshold time. A touch and hold may be used along with a long press. When a touch input is maintained for the threshold time or more for enabling the user to determine whether the touch input is the tap or the touch and hold, a feedback signal may be visually or acoustically supplied.

A drag and drop denotes a motion where a user drags identification information of an application to a certain position with a finger or a touch tool and then lifts the finger or the touch tool.

A pinch to zoom denotes a motion where a user progressively increases or decreases an interval between two or more fingers or touch tools. When an interval between fingers increases, the pinch to zoom may be used as an input which extends a screen displayed on a touch screen (e.g. zoom-in). When an interval between fingers decreases, the pinch to zoom may be used as an input which reduces a screen displayed on a touch screen (e.g. zoom-out).

In the present disclosure, a motion input denotes a motion which is applied to a wearable device by a user for controlling the wearable device. For example, the motion input may include an input where the user rotates the wearable device, tilts the wearable device, or moves the wearable device in an up, down, left, or right direction. A wearable device may sense the motion input predetermined by the user by using an acceleration sensor, a tilt sensor, a gyro sensor, a 3-axis magnetic sensor, and/or the like.

In the present disclosure, a bending input denotes an input where a user bends a whole or partial region of an electronic device for controlling the electronic device when a wearable device is a flexible display apparatus. According to an embodiment of the present disclosure, a wearable device may sense a bending position (a coordinate value), a bending direction, a bending angle, a bending speed, the number of times the wearable device is bent, a timing when a bending operation starts, a time for which the bending operation is maintained, and/or the like by using a bending sensor.

In the present disclosure, a key input denotes an input where a user controls a wearable device by using a physical key attached to the wearable device.

In the present disclosure, a multimodal input denotes a case where at least two or more input types are combined. For example, a wearable device may receive a user's touch input and a motion input and may also receive the user's touch input and a voice input. Also, the wearable device may receive the user's touch input and eyeball input. An eyeball input denotes an input where the user adjusts the blinking of eyes, a viewing position, a movement speed of an eyeball, and/or the like for controlling the wearable device.

According to an embodiment of the present disclosure, a wearable device may include a communication unit that receives an application execution command from an external device connected to the wearable device.

Examples of an external device may include a portable terminal, a smartphone, a notebook computer, a laptop computer, a tablet personal computer (PC), an e-book terminal, a digital broadcasting terminal, a personal digital assistant (PDA), a portable multimedia player (PMP), a navigation device, a moving picture experts group audio layer 3 (MP3) player, and/or the like, but are not limited thereto.

For example, a user may request execution of an application installed in a wearable device by using a portable terminal, a smartphone, a notebook computer, a tablet PC, a navigation device, or the like connected to the wearable device. The external device may transmit an application execution command to the wearable device through short-distance communication (for example, Bluetooth, near field communication (NFC), wireless fidelity direct (WFD), or the like).

According to an embodiment of the present disclosure, a wearable device may execute an application in response to a user input. The user input may be an input that requests execution of the application. Also, the wearable device may receive an execution command from an external device connected to the wearable device and execute the application of the wearable device.

FIGS. 2A to 2D are diagrams of bringing a wearable device in contact with a user. FIGS. 2A to 2D illustrate cases where a wearable device is brought in contact with a user, namely, there is no medium between the wearable device and a body of the user.

Figure 2A:
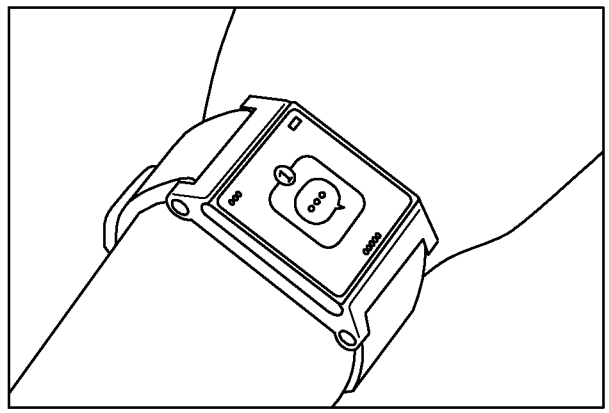
FIGS. 2A to 2D are diagrams of bringing a wearable device in contact with a user.

Referring to FIG. 2A, a watch among wearable devices may be generally worn on a wrist. When a user wears a wearable device on a wrist, the user may easily look at a screen of the wearable device through a motion of lifting an arm or hand, where it is convenient to carry the wearable device.

Figure 2B:
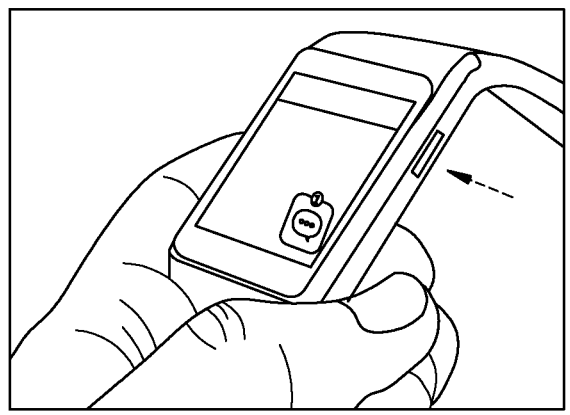

Referring to FIG. 2B, a user may grip a wearable device with a hand. A motion of gripping the wearable device with a hand may be referred to as a grip. When the user grips the wearable device, it is convenient to carry the wearable device, and the user may fix the wearable device by adjusting a force of gripping the wearable device.

Figure 2C:
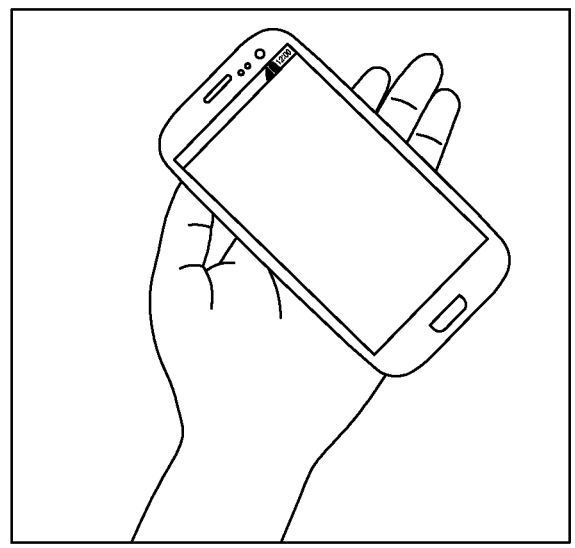

Referring to FIG. 2C, a wearable device may be located on a part of a human body. The wearable device may be located on a part of the human body such as a palm, or may be located on a knee when a user sits. A light wearable device may be supported for a long time even without applying a separate physical force.

Figure 2D:

Referring to FIG. 2D, a user may wear a wearable device in a form of glasses. When the wearable device is worn by using ears and a bridge of a nose for support, a screen of the wearable device may be positioned just in front of the eyes, and thus, it is easy to implement augmented reality (AR).

Four cases are described above, but a method of bringing a wearable device in contact with a user is not limited to the four cases. It may be understood by one of ordinary skill in the art that a user may touch a wearable device in various forms. In the following description, for convenience of a description, a wearable device may be referred to as a terminal.

Figure 3:
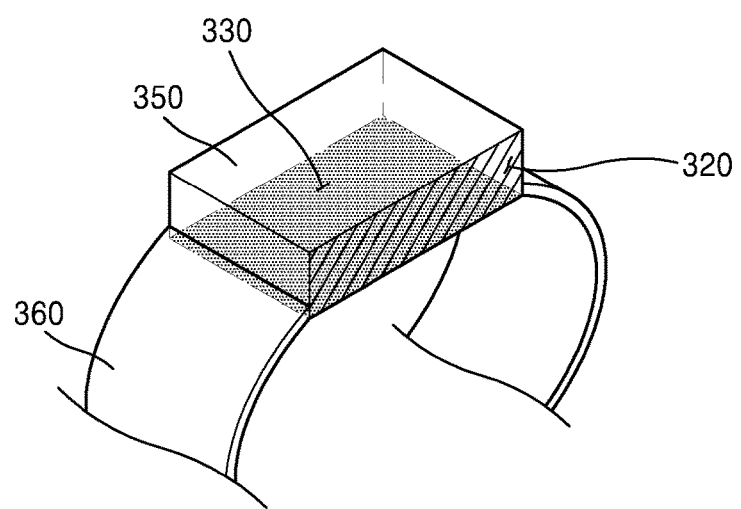
FIG. 3 is a diagram of a terminal according to an embodiment of the present disclosure.

FIG. 3 is a diagram of a terminal 300 according to an embodiment of the present disclosure.

The terminal 300 may be an object having volume and thus may include a front surface, a rear surface, and a side surface with respect to a viewing direction of a user. In addition, the terminal 300 may further include an instrument 360 that fixes the terminal 300 to a body of the user. Examples of the instrument 360 may include a strap in a watch type, a band in a band type, and temples in a glasses type.

Using a watch type terminal 300 as an example, a screen 350 viewed by the user may be displayed on the front surface of the terminal 300. The screen 350 may include an image display panel such as a liquid crystal panel, an organic light emitting panel, or the like and may display a graphic of a UI that represents a function setting, a software application, or content such as music, a photograph, a video, or the like.

The screen 350 may include an input unit that receives a user input. The input unit may be a touch screen where a touch panel and an image display panel have a layer structure. The touch panel may be, for example, a capacitive touch panel, a resistive touch panel, an infrared touch panel, or the like. The image display panel may be, for example, a liquid crystal panel, an organic light emitting panel, or the like. Such touch screen panels are well known to one of ordinary skill in the art, and thus, a detailed description of a panel structure is omitted. The image display panel may display the graphics of the UI.

The terminal 300 may include a distance measurement unit 320. The distance measurement unit 320 may be disposed on the side surface of the terminal 300. However, the position of the distance measurement unit 320 is not limited to the side surface of the terminal 300, and the distance measurement unit 320 may also be disposed on the front surface or rear surface of the terminal 300. The distance measurement unit 320 may measure a distance between the terminal 300 and an object other than the terminal 300. The distance measurement unit 320 may measure a distance by using a sensor, and for example, the sensor may use an ultrasound distance sensor or an infrared distance sensor.

The terminal 300 may include a contact sensing unit 330. The contact sensing unit 330 may be disposed at a portion of the terminal 300 which is brought in contact with a body of a user, and for example, may be disposed on the rear surface of the terminal 300. The contact sensing unit 330 may transmit a signal to the terminal 300 and sense a changed value of the transmitted signal to determine whether parts of the user contact each other. A method of determining whether parts of a user are brought in contact with each other may use a swept frequency capacitive sensing scheme or a human body communication scheme.

A swept frequency capacitive sensing scheme is a scheme where a user touches a person, a table, a thing, an object, or the like, and when the touch is sensed, communication is performed through one conductor. Parts of a person may generate signals having different frequency characteristics, and the generated signals may be referred to as body signals. Information of each of the body signals may be referred to as a body frequency characteristic. The body frequency characteristic may be broadly construed as a characteristic for distinguishing a signal band, amplitude, and/or the like of a body signal generated from a certain body part, in addition to a frequency.

Touch interface technology based on a frequency characteristic is technology that senses a change by using frequency recognition technology, and when a human body is touched, senses a certain frequency characteristic. Furthermore, a knuckle, a fingernail, a finger tip, and a finger pad may be recognized differently. Therefore, a controller of the terminal 300 may distinguish various touch inputs such as a finger tip touch, a multi-touch, etc. by using the swept frequency capacitive sensing scheme.

A human body communication scheme denotes a scheme that transfers a signal based on a change in electrical energy by using a human body. In the human body communication scheme, it is possible to communicate with devices (for example, a wristwatch, a portable terminal, a PDA, etc.) connected to a human body by using the human body having conductivity. The human body communication scheme is a technology where a human body is used as one conductor, and by applying a weak electrical signal to the human body, communication is performed by transmitting and receiving an electrical signal based on the weak electrical signal. The terminal 300 may apply a weak electrical signal to a human body through the contact sensing unit 330, receive an electrical signal based on the weak electrical signal, and determine a type of a body contact, based on a changed value of the received electrical signal.

Figure 4:
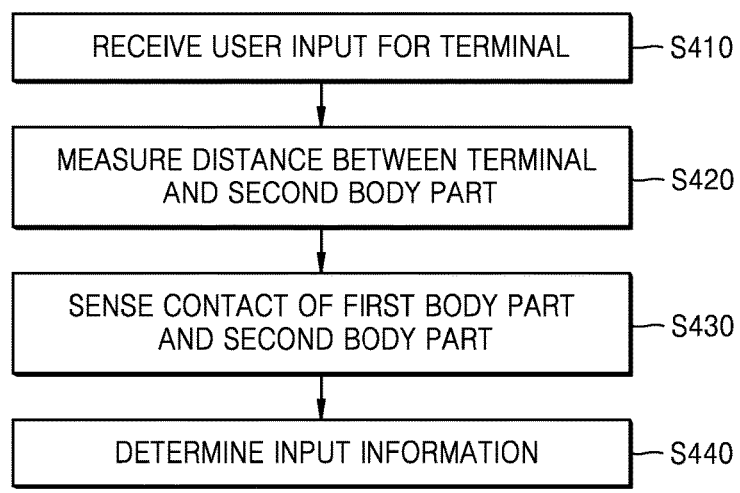
FIG. 4 is a flowchart of a touch input method according to an embodiment of the present disclosure.

FIG. 4 is a flowchart of a touch input method according to an embodiment of the present disclosure.

Figure 5:
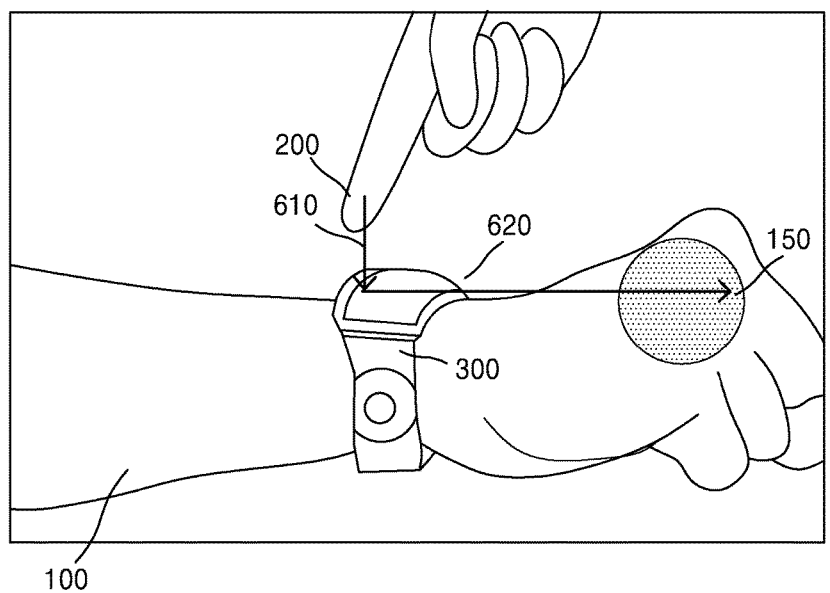
FIG. 5 is a diagram of a touch input method according to an embodiment of the present disclosure.

First, a case where the terminal 300 is physically brought in contact with a first body part 100, as illustrated in FIG. 5, of a user will be described as an example. A body part denotes a part of a body of a user. Due to the characteristics of the human body, it is difficult to distinguish a body part by clearly specifying a boundary, but in terms of common knowledge of ordinary persons, a part of a body of a person may correspond to a body part in the present disclosure. For example, a body part located on a neck may be referred to as a head, a left arm may be referred to as one body part with respect to a left shoulder, and a left arm may be classified as a forearm, an elbow, a wrist, and a hand in detail. In detail, a hand may be classified as a plurality of body parts such as a palm and fingers. On the other hand, adjacent body parts may be referred to as one body part. For example, a left wrist and a left hand may be referred to as one body part, and a left arm and a left wrist may be referred to as one body part. Therefore, in the present disclosure, a body part may be broadly construed as including a certain body part and a part adjacent thereto.

The terminal 300 may be physically brought in contact with the first body part 100. A physical contact indicates that there is no medium between a body part and the terminal 300. That is, the physical contact denotes a state where a body part directly touches the terminal 300, and thus, a signal transmitted by the terminal 300 is transferred to the body part. For example, when a watch type terminal 300 is worn on a left wrist and thus a transmission signal of the watch type terminal 300 is transferred to the left wrist, this may be recognized as the watch type terminal 300 being physically brought in contact with a body part. However, when the watch type terminal 300 is worn over a long sleeve shirt covering the left wrist, the transmission signal of the watch type terminal 300 is not transferred to the left wrist, and this may not be recognized as the watch type terminal 300 being physically brought in contact with the body part. The reason is that recognizing a body part as one touch input part using a scheme such as the swept frequency capacitive sensing scheme or the human body communication scheme for implementing the above-described details assumes a physical contact. Although there is a medium between the terminal 300 and a body part, when the scheme is capable of being applied through the medium, this may correspond to a physical contact in the present disclosure.

In operation S410, of FIG. 4, the terminal 300 which is brought in contact with the first body part 100 may receive a user input. In this case, the user input may be an input using a second body part 200 of the user. The second body part 200, illustrated in FIG. 5, denotes a body part which is distinguished from the first body part 100. Although it is difficult to clearly distinguish the first body part 100 and the second body part 200, in the present disclosure, the second body part 200 may be referred to as a body part which moves independently of the first body part 100 according to the user's intention. For example, when the first body part 100 is a left wrist, the second body part 200 may be a body part which moves independently of the left wrist according to the user's intention like a right hand, a right foot, a left foot, or a head. As described above, since it is difficult to clearly distinguish body parts, a left wrist and a left hand may be understood as one body part.

When a user input for the terminal 300 is received, the terminal 300 may perform an operation corresponding to the user input. In the present disclosure, the user input may be, for example, a swipe (or swype) touch. The swipe touch may be a motion where the user touches a certain region of a touch screen of the terminal 300 and moves by a certain distance in a certain direction. When the user touches a certain region of the touch screen of the terminal 300 with a body part and moves the body part by a certain distance to a boundary of the touch screen, the terminal 300 may perform an operation corresponding to a swipe touch input. A swipe input of the user applied to the touch screen may be set as an activation command for the distance measurement unit 320 of the terminal 300. When the terminal 300 receives the swipe input of the user, the terminal 300 may command the distance measurement unit 320 to measure a distance between the terminal 300 and an object.

The user input may be an input in which the user touches a region (hereinafter referred to as a distance measurement unit region) where the distance measurement unit 320 is disposed. The terminal 300 may set a direct touch input of the user in the distance measurement unit 320 region as an activation command for the distance measurement unit 320. Therefore, when the terminal 300 receives a touch input signal indicating that the user is touching the distance measurement unit 320 region, the terminal 300 may command the distance measurement unit 320 to measure a distance between the terminal 300 and an object.

In an example, the terminal 300 may command the distance measurement unit 320 to continuously measure a distance. In this case, the terminal 300 may acquire distance measurement values for a peripheral region of the terminal 300, before and after a user input, and thus, the user input is accurately determined. However, power is consumed.

Activation of the distance measurement unit 320 of the terminal 300 may be performed according to an input other than a direct touch input applied to the terminal 300. For example, when a gyro sensor and an acceleration sensor built into the terminal 300 sense that the user is shaking the terminal 300 in a predetermined pattern, or when the terminal 300 receives a voice command input, the distance measurement unit 320 of the terminal 300 may be activated.

In operation S420 of FIG. 4, after the terminal 300 receives the user input for the terminal 300, the terminal 300 may activate the distance measurement unit 320, and the distance measurement unit 320 may measure a distance between the terminal 300 and an object. In the present disclosure, the distance measurement unit 320 may measure a distance between the terminal 300 and the second body part 200. When an object is located at a distance and angle which are measurable by the distance measurement unit 320, the distance measurement unit 320 may measure a distance between the terminal 300 and the object. For example, the distance measurement unit 320 may measure a distance to an object which is located within 20 cm from the distance measurement unit 320 and within a horizontal/vertical optical angle of 150 degrees.

The distance between the terminal 300 and the second body part 200 may be a minimum distance from a side boundary of the terminal 300 to the second body part 200. The side boundary of the terminal 300 may be set on the assumption that the distance measurement unit 320 of the terminal 300 is positioned on the side surface of the terminal 300, and the distance between the terminal 300 and the second body part 200 may denote a straight distance from the distance measurement unit 320 of the terminal 300 to the second body part 200.

The second body part 200 may correspond to a body part that applies a user input to the terminal 300. A body part which touches the touch screen region or distance measurement unit 320 region of the terminal 300 may correspond to the second body part 200. The distance measurement unit 320 may measure the distance which the second body part 200 moves after a touch input for the terminal 300 is received, and thus, the distance measurement unit 320 may continuously or periodically measure a distance from the terminal 300 to the moving second body part 200 after the distance measurement unit 320 is activated, and store a measurement value of the distance in a memory of the terminal 300. The memory of the terminal 300 may accumulatively store a measurement value of a distance between the terminal 300 and the second body part 200.

In operation S430, the terminal 300 may sense a contact between the first body part 100 and the second body part 200. Since the second body part 200 generally moves to contact the first body part 100, the second body part 200 may be considered as contacting the first body part 100.

The terminal 300 may be physically brought in contact with the first body part 100, and by applying the swept frequency capacitive sensing scheme or the human body communication scheme, the terminal 300 may transmit a signal to the first body part 100. When an electrical signal which is transmitted through the first body part 100 by the terminal 300 flows in a human body and then is again received by the terminal 300, the terminal 300 may acquire contact information between the first body part 100 and the second body part 200, based on a changed value of the received electrical signal. The terminal 300 may acquire the contact information which includes a contact time, a contact region, a contact material, the number of contacts, etc., in addition to a simple contact.

Contact of the first body part 100 and the second body part 200 may be sensed in an extended touch region of the first body part 100. The extended touch region of the first body part 100 may denote a region which enables contact of the second body part 200 located near an area contacting the terminal 300. The terminal 300 may determine the extended touch region, which is a contact prediction region, before the first body part 100 is brought in contact with the second body part 200. When the first body part 100 is brought in contact with the second body part 200, a contact region of the first and second body parts 100 and 200 may correspond to the extended touch region, and the terminal 300 may restrictively determine the contact region as a region within a certain distance of the terminal 300, thereby preventing a manipulation of the user from being performed accidentally.

The terminal 300 may determine an extended touch region, based on user input information received by the terminal 300. Since the terminal 300 has received a touch input of the second body part 200 for the touch screen region or the distance measurement unit 320 region, the terminal 300 may store the user input information including a type, a direction, etc. of a touch of the second body part 200 for the touch screen region or the distance measurement unit 320 region. For example, the contact sensing unit 330 of the terminal 300 may be physically brought in contact with a left wrist, and when a swipe input of the user in a left direction is received through the touch screen, a left forearm region which is located on the left of the terminal 300 with respect to the left wrist may be determined as the extended touch region. On the other hand, when a right-direction swipe input of the user is received through the touch screen, a left hand back region which is located on the right of the terminal 300 with respect to the left wrist may be determined as the extended touch region.

Moreover, a moving direction of the second body part 200 may be determined based on a change in a measurement value measured by the distance measurement unit 320. An increase/decrease in a distance measurement value between the terminal 300 and the second body part 200 which is measured by the distance measurement unit 320 after a user input for the terminal 300 may be determined as a movement of the second body part 200, and an extended touch region may be determined based on a moving direction and a moving speed. For example, the contact sensing unit 330 of the terminal 300 may be physically brought in contact with the left wrist of the user, and when it is determined by the controller of the terminal 300 that a moving direction of the second body part 200 is a left direction based on a distance measurement value measured by the distance measurement unit 320, a left forearm region which is located on the left with respect to the left wrist may be an extended touch region. Alternatively, when it is determined by the controller of the terminal 300 that the moving direction of the second body part 200 is a right direction based on the distance measurement value measured by the distance measurement unit 320, a region on the back of the left hand which is located on the right with respect to the left wrist may be the extended touch region.

Therefore, in determining an extended touch region, the terminal 300 may consider both user input information, which is touch-input to the terminal 300, and a distance measurement value measured by the distance measurement unit 320 of the terminal 300.

In operation S440, the terminal 300 may determine input information for the terminal 300, based on measured distance information between the terminal 300 and the second body part 200 and contact information between the first body part 100 and the second body part 200 sensed by the terminal 300. By using the distance measurement unit 320 and the contact sensing unit 330, the terminal 300 may determine a touch input intended by the user, based on contact of the second body part 200 with the extended touch region. The touch input intended by the user may be determined based on a moving direction of contact of the first body part 100 and the second body part 200, a contact maintaining time, a shape of a contact surface, and/or the like.

The distance measurement unit 320 of the terminal 300 may measure angle formation in addition to measuring a distance from the terminal 300 to the second body part 200. When two or more distance measurement units 320 are included in the terminal 300, the controller may perform an arithmetic operation on two or more measurement values measured by a triangular measurement scheme or the like to accurately determine an angle at which the first body part 100 is brought in contact with the second body part 200. When three distance measurement units 320 are used, the controller may perform an arithmetic operation on three measurement values to acquire three-dimensional (3D) movement information of the second body part 200 in the extended touch region. However, since the distance measurement unit 320 is disposed on one surface of the terminal 300, a distance to the second body part 200 may be measured within only a certain angle range, and only when the second body part 200 is located within a limited distance range, the distance may be measured.

The controller of the terminal 300 may distinguish a user input, based on contact information and a value measured by the distance measurement unit 320 of the terminal 300. For example, when it is determined by the controller of the terminal 300 that a distance extends farther away from the terminal 300 while contact of the first body part 100 and the second body part 200 is being maintained, the controller of the terminal 300 may determine a touch input as a swipe touch input. When it is determined by the controller of the terminal 300 that the first body part 100 is brought in contact with the second body part 200 twice or more and a distance and an angle are constant in the extended touch region, the controller of the terminal 300 may determine a touch input as a continuous touch input. When it is determined by the controller of the terminal 300 that contact of the first body part 100 and the second body part 200 is maintained for at least a certain time and a distance to the second body part 200 is not changed during the certain time, the controller of the terminal 300 may determine a touch input as a long press input. Also, when contact of the first body part 100 and the second body part 200 is sensed in two or more regions at the same time, the controller of the terminal 300 may determine a touch input as a multi-touch input. In a multi-touch, the controller of the terminal 300 may determine a touch input as a pinch-to-zoom input, based on a subsequent swipe input. In the present disclosure, the pinch-to-zoom denotes a user input where two touch inputs are respectively received through two regions of a touch screen and are dragged, and thus, an interval between the two touch inputs increases or decreases. Also, the pinch-to-zoom may include a user input where multi touch inputs are received through three or more regions, and an interval between the multi touch inputs increases or decreases.

As described above, a user input is more accurately distinguished in a case, where the user input is determined based on both information obtained by the distance measurement unit 320 and information obtained by the contact sensing unit 330, than a case where the user input is determined based on information obtained by one of the distance measurement unit 320 and the contact sensing unit 330.

Since contact of the second body part 200 with the first body part 100 in the extended touch region is accurately distinguished, the terminal 300 may use the extended touch region as one touch input part. The controller of the terminal 300 may determine a distance, an angle, the number of contacts, an area, etc. of the second body part with respect to the first body part 100 to distinguish an input intended by the user, and thus may use the extended touch region as an input part of the terminal 300.

For example, when a number keypad is displayed on a small touch screen like a smartwatch, there is a possibility that an abnormal user input is received, but when the number keypad is displayed on an extended touch region having a broad area like the back of a hand, the chance of occurrence of an abnormal user input is reduced.

In detail, a contact state of the second body part 200 sensed by the distance measurement unit 320 and contact sensing unit 330 of the terminal 300 may be displayed on the touch screen of the terminal 300 in real time, and thus, a user input is easily received by the terminal 300. For example, when the terminal 300 must receive a number input from the user (for example, while a calculator application is being executed), information of an extended touch region may be displayed on the touch screen region of the terminal 300 to overlap a current screen. It is determined that contact of the user is sensed in one region of the extended touch region, the controller of the terminal 300 may extend one region of the touch screen corresponding to the one region of the extended touch region or adjust brightness, and thus may display the one region of the touch screen differently from a peripheral region, thereby enabling the user to know a position of the touch screen corresponding to contact of the second body part 200.

In order to provide the user with more accurate contact information of an extended touch region, the terminal 300 may photograph a movement of the second body part 200 in the extended touch region by using a camera sensor and display a photographed screen on the touch screen. In this case, by semitransparently displaying a screen photographed by the camera sensor in the original touch screen region, the terminal 300 accurately informs the user of a position of the second body part 200.

FIG. 5 is a diagram of a touch input method according to an embodiment of the present disclosure.

The terminal 300 may be in a state of being physically brought in contact with a first body part 100. Referring to FIG. 5, a rear surface of a smartwatch terminal 300 may be physically brought in contact with a right wrist corresponding to the first body part 100, and the smartwatch terminal 300 may sense contact of a second body part 200 with the first body part 100 by using the contact sensing part 330 which is disposed at a contact portion. Since the smartwatch terminal 300 is worn on the right wrist, a left hand forefinger which moves independently of the right wrist may correspond to the second body part 200.

The touch screen of the terminal 300 may receive a touch input of a user 510. The terminal 300 may determine an extended touch region 150, based on touch input information of the user received through the touch screen and a distance measurement value of the left hand forefinger measured by the distance measurement unit 320. As illustrated in FIG. 5, when an input unit of the terminal 300 receives a touch input, which swipes the touch screen in a direction of a right hand middle finger, from the user 520, the controller of the terminal 300 may determine a body contact of the user as being made in a traveling direction of a swipe input, based on the touch input information of the user. Also, the distance measurement unit 320 of the terminal 300 may determine that the left hand forefinger corresponding to the second body part 200 of the user becomes farther away from the terminal 300 and a direction thereof is the same direction as that of the swipe input in the touch screen. Therefore, the terminal 300 may predict that contact of the second body part 200 with the first body part 100 is to be made in the extended touch region 150 in the traveling direction of the swipe input.

In addition, the terminal 300 may determine, as one control input for the terminal 300, contact of the second body part 200 with the first body part 100 in the extended touch region 150 after the second body part 200 touches the touch screen. The terminal 300 may determine, as input information of the terminal 300, the contact of the second body part 200 with the first body part 100 so as to intuitively show the user that a touch input is being performed in the extended touch region 150.

For example, as illustrated in FIG. 5, the swipe input may be received through the touch screen of the terminal 300, and the terminal 300 may determine, as the extended touch region 150, a region within a certain distance and a certain angle in a swipe touch direction. When it is determined by the distance measurement unit 320 and contact sensing unit 330 of the terminal 300 that contact of the second body part 200 is being continuously made in a swipe input direction for a certain time and becomes farther away from the terminal 300, the terminal 300 may determine a touch input as a swipe input for the terminal 300 in the same direction as the swipe input direction in the touch screen. The terminal 300 may control a screen which is being displayed, based on the determined swipe input. For example, when it is determined by the terminal 300 that a swipe touch is received from the user while an image viewer application is being executed, the terminal 300 may switch a screen to a next image. When it is determined by the terminal 300 that contact of the second body part 200 with the first body part 100 in the extended touch region 150 is maintained by a long movement distance for a short time, the terminal 300 may quickly control switching to a next image. In other words, the terminal 300 may match a speed of the swipe input with a control speed of the terminal 300 and perform control. When the contact of the second body part 200 with the first body part 100 in the extended touch region 150 is determined as the swipe input and thus the swipe input is continuously performed, the terminal 300 may continuously switch an image displayed on a screen.

Figure 6:
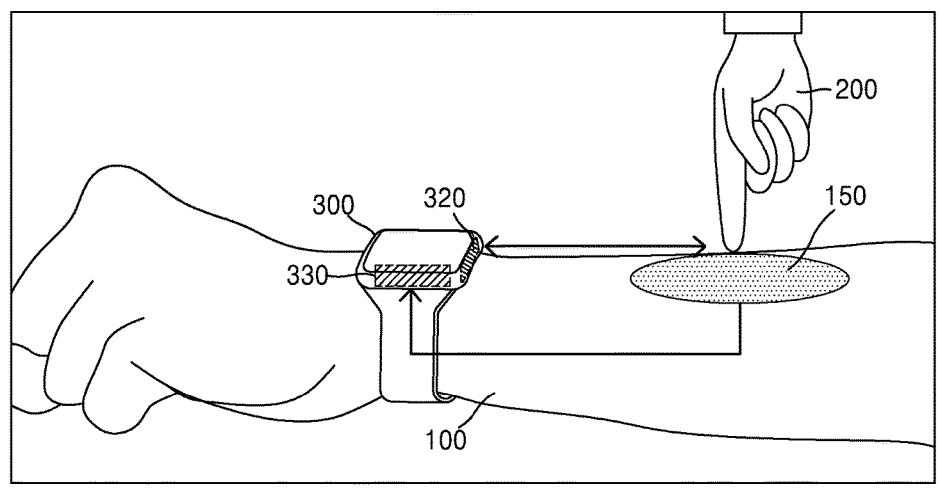
FIGS. 6 and 7 are diagrams of touch input methods according to embodiments of the present disclosure.
Figure 7:
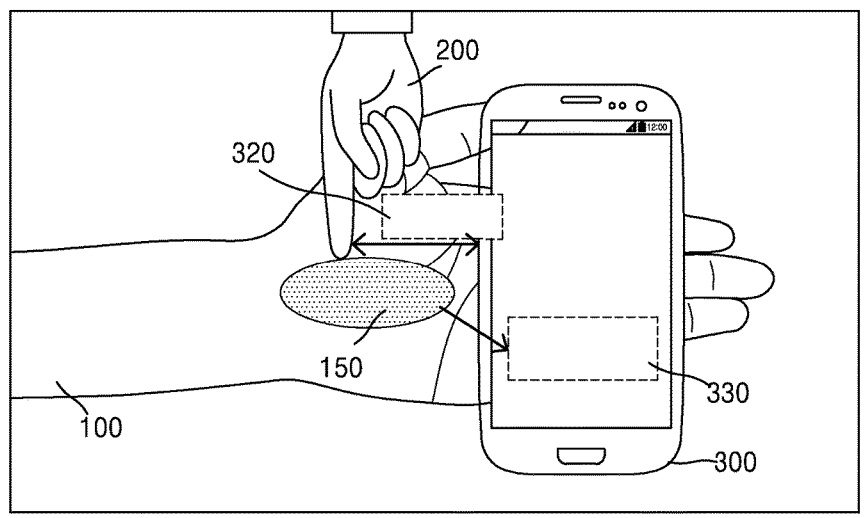

FIGS. 6 and 7 are diagrams of touch input methods according to embodiments of the present disclosure.

Referring to FIG. 6, the terminal 300 may be worn on an arm corresponding to a first body part 100. The terminal 300 may receive a user input from a right hand forefinger corresponding to a second body part 200 and sense contact of the right hand forefinger with a partial region of an arm corresponding to an extended touch region 150. The distance measurement unit 320 of the terminal 300 may measure a distance from the distance measurement unit 320 of the terminal 300 to the right hand forefinger, and measurement values may be continuously stored in the storage of the terminal 300. The contact sensing unit 330 of the terminal 300 may sense contact of the right hand forefinger with the extended touch region 150 and sense a contact time and a contact area of the right hand forefinger in the extended touch region 150. The terminal 300 may determine a type of the contact of the right hand forefinger with the extended touch region 150, based on a distance measurement value and contact sensing information.

Referring to FIG. 7, the terminal 300 may be located on left hand fingers corresponding to a first body part 100 of a user. The terminal 300 may receive a user input from a right hand forefinger corresponding to a second body part 200 and sense contact of a palm with an extended touch region 150. The distance measurement unit 320 of the terminal 300 may measure a distance from the distance measurement unit 320 of the terminal 300 to the right hand forefinger and may continuously store measurement values in the storage of the terminal 300. The contact sensing unit 330 of the terminal 300 may sense contact of the right hand forefinger with the extended touch region 150 and sense a contact time, a contact area, etc. of the right hand forefinger in the extended touch region 150. The terminal 300 may determine a kind of the contact of the right hand forefinger with the extended touch region 150, based on a distance measurement value and contact sensing information.

Hereinafter, a method where the controller of the terminal 300 determines contact of the second body part 200 with the first body part 100 as an input for the terminal 300 is described in detail.

Figure 8:
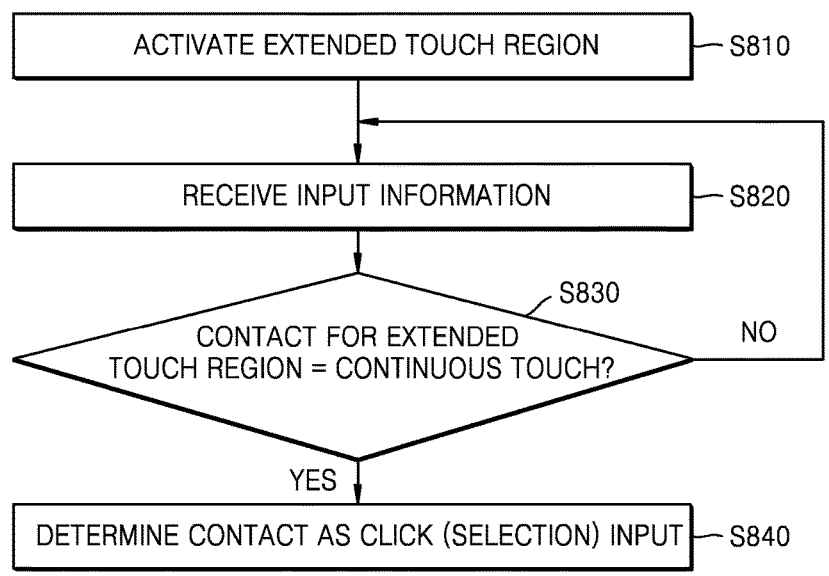
FIG. 8 is a flowchart of a touch input method according to an embodiment of the present disclosure.

FIG. 8 is a flowchart of a touch input operation according to an embodiment of the present disclosure. The terminal 300 may determine the extended touch region 150.

Referring to FIG. 8, in operation S810, the determined extended touch region 150 may be disposed in or near the first body part 100, and the terminal 300 may stand by until contact of the second body part 200 is sensed and may activate the extended touch region 150. An operation of determining the extended touch region 150 is described above in detail, and thus, its detailed description is not repeated.

In operation S820, the contact sensing unit 330 of the terminal 300 may sense that the first body part 100 is brought in contact with the second body part 200 of a user in the extended touch region 150 and may receive contact sensing information as input information for controlling the terminal 300.

In operation S830, the controller of the terminal 300 may determine whether contact of the second body part 200 with the extended touch region 150 is a continuous touch, based on a measurement value measured by the distance measurement unit 320 of the terminal 300 and a distance between the terminal 300 and the second body part 200 sensed by the contact sensing unit 330 of the terminal 300. A continuous touch denotes that a first touch is applied to a certain region of the extended touch region 150 and then a second touch is applied to the certain region or a peripheral region of the certain region within a certain time after the first touch.

In operation S840, when it is determined by the terminal 300 that the contact of the second body part 200 with the first body part 100 in the extended touch region 150 is a continuous touch, the terminal 300 may determine the contact as a click input for the terminal 300. Therefore, the terminal 300 may select a program which is being executed in the terminal 300 or may extend an image which is being displayed by the terminal 300, based on the click input.

Figure 9A:
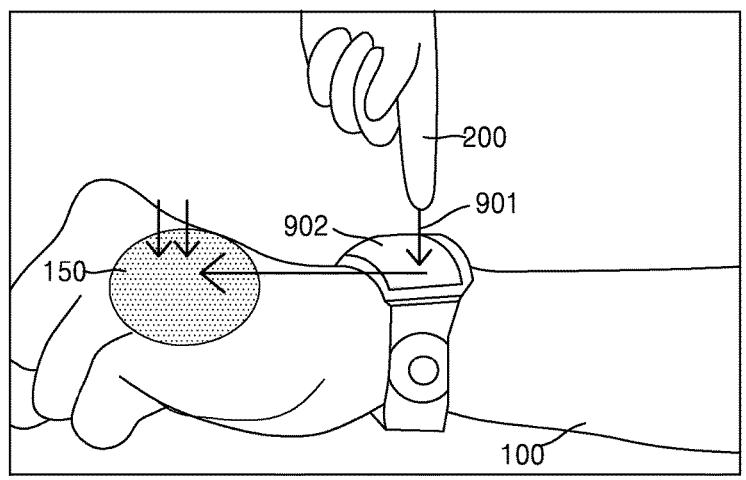
FIGS. 9A and 9B are diagrams of touch input methods according to embodiments of the present disclosure.
Figure 9B:
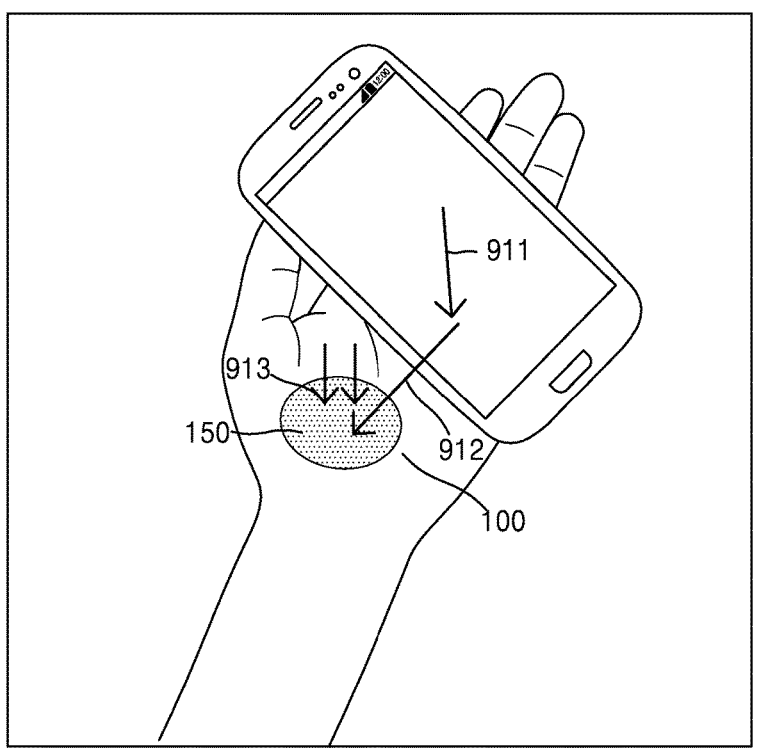

FIGS. 9A and 9B are diagrams of touch input methods according to embodiments of the present disclosure.

Referring to FIG. 9A, a user wears a watch type terminal 300 on a left wrist and touches the terminal 300 with a right hand forefinger. A rear surface of the terminal 300 may be physically brought in contact with a left wrist corresponding to a first body part 100 of the user, and the terminal 300 may sense contact of a right hand forefinger, corresponding to a second body part 200, with the first body part 100 by using the contact sensing part 330 which is disposed at a contact portion. The terminal 300 may receive a user input, applied by the second body part 200, to the touch screen of the terminal 300. Since the terminal 300 is worn on the left wrist, the right hand forefinger which moves independently of the left wrist may correspond to the second body part 200.

The touch screen of the terminal 300 may receive a touch input of the right hand forefinger of the user 901. The terminal 300 may determine an extended touch region 150, based on touch input information of the user received through the touch screen and a distance measurement value of the right hand forefinger measured by the distance measurement unit 320. The input unit of the terminal 300 may receive a swipe input, which is applied to the touch screen by the right hand forefinger of the user, in a direction of a left hand middle finger 902. The controller of the terminal 300 may determine a body contact of the user as being made in the same direction as that of the swipe input, based on the input information of the user. Also, the distance measurement unit 320 of the terminal 300 may determine that the right hand forefinger corresponding to the second body part 200 of the user becomes farther away from the terminal 300 and a direction thereof is the same direction as that of the swipe input. Therefore, the terminal 300 may predict that contact of the second body part 200 with the first body part 100 is to be made in the extended touch region 150 (i.e. a back of a left hand) in the direction of the swipe input of the terminal 300.

The extended touch region 150 predicted by the terminal 300 may be disposed on a back of a left hand near the left wrist on which the terminal 300 is worn. In an embodiment of the present disclosure, the left wrist on which the terminal 300 is worn and the back of the left hand which is the extended touch region 150 may be collectively understood as the first body part 100. The distance measurement unit 320 of the terminal 300 may continuously or periodically transmit an electrical signal to the first body part 100 until contact of the right hand forefinger is sensed from the back of the left hand, and thus may activate the extended touch region 150. The contact sensing unit 330 of the terminal 300 may sense a continuous contact, which is made on the back of the left hand by the right hand forefinger of the user, in the extended touch region 150. The terminal 300 may receive sensed contact information as input information for controlling the terminal 300. The controller of the terminal 300 may determine contact of the right hand forefinger with the extended touch region 150 as a continuous touch, based on a measurement value measured by the distance measurement unit 320 of the terminal 300 and a distance between the terminal 300 and the second body part 200 sensed by the contact sensing unit 330 of the terminal 300. Therefore, the terminal 300 may determine the contact of the right hand forefinger as a continuous click input for the terminal 300. That is, the terminal 300 may determine the contact of the right hand forefinger as a continuous click input which selects an object displayed on a screen. Therefore, the terminal 300 may execute a program of the terminal 300 or select the object displayed on the screen.

For example, when a music reproduction application is being executed by the terminal 300, the terminal 300 may receive a continuous swipe touch input, which is applied to the back of the left hand corresponding to the extended touch region 150 and the touch screen by using the right hand forefinger, from the user and change a reproduction list displayed on a screen, based on the continuous swipe touch input. After the reproduction list displayed on the screen is changed, when the contact sensing unit 330 senses a continuous touch applied to the back of the left hand which is the extended touch region 150, the terminal 300 may determine the continuous touch as a double click input for the reproduction list and reproduce certain music.

Referring to FIG. 9B, a smartphone terminal 300 is located on left hand fingers of a user and the user touches the terminal 300 with a right hand forefinger. A rear surface of the terminal 300 may be physically brought in contact with a left hand (e.g. fingers) corresponding to a first body part 100 of the user, and the terminal 300 may sense contact of a right hand forefinger, corresponding to a second body part 200, and a left hand palm corresponding to the first body part 100 by using the contact sensing part 330 which is disposed at a contact portion. The terminal 300 may receive a user input, applied by the second body part 200, to the touch screen of the terminal 300.

The terminal 300 may receive a swipe touch input of the user on the touch screen 911 and measure a distance to the right hand forefinger in the same direction as that of the swipe touch input. The terminal 300 may determine an extended touch region 150 as one region in a swipe direction, based on the received swipe touch input of the user and a distance measurement value of the right hand forefinger measured by the distance measurement unit 320 of the terminal 300. The contact sensing unit 330 of the terminal 300 may sense a swipe touch contact 912 of the second body part 200 with a left hand which is the first body part 100. The controller of the terminal 300 may determine the extended touch region 150 as a left hand palm. In an embodiment of the present disclosure, the left hand fingers on which the terminal 300 is located and the left hand palm which is the extended touch region 150 may all be understood to be the first body part 100. The distance measurement unit 320 of the terminal 300 may continuously or periodically transmit an electrical signal to the first body part 100 until contact of the right hand forefinger is sensed from the left hand, and thus may activate the extended touch region 150. The contact sensing unit 330 of the terminal 300 may sense a continuous contact 913, which is made on the left hand palm by the right hand forefinger of the user, in the extended touch region 150. The controller of the terminal 300 may determine contact of the right hand forefinger with the extended touch region 150 as a continuous touch, based on a measurement value measured by the distance measurement unit 320 of the terminal 300 and a distance between the terminal 300 and the second body part 200 sensed by the contact sensing unit 330 of the terminal 300. Therefore, the terminal 300 may determine the contact of the right hand forefinger as a click input for the terminal 300. That is, the terminal 300 may determine the contact of the right hand forefinger as a click input which selects an object displayed on a screen. Therefore, the terminal 300 may execute a program of the terminal 300 or select the object displayed on the screen.

For example, when a webtune application is being executed by the terminal 300, the terminal 300 may receive a continuous swipe touch input, which is applied to the left hand palm corresponding to the extended touch region 150 and the touch screen by using the right hand forefinger, from the user and change a webtune list displayed on a screen, based on the continuous swipe touch input. After the webtune list displayed on the screen is changed, when the contact sensing unit 330 of the terminal 300 senses a continuous touch applied to the left hand which is the extended touch region 150, the terminal 300 may determine the continuous touch as a double click input for the webtune list and reproduce a certain webtune.

Figure 10:
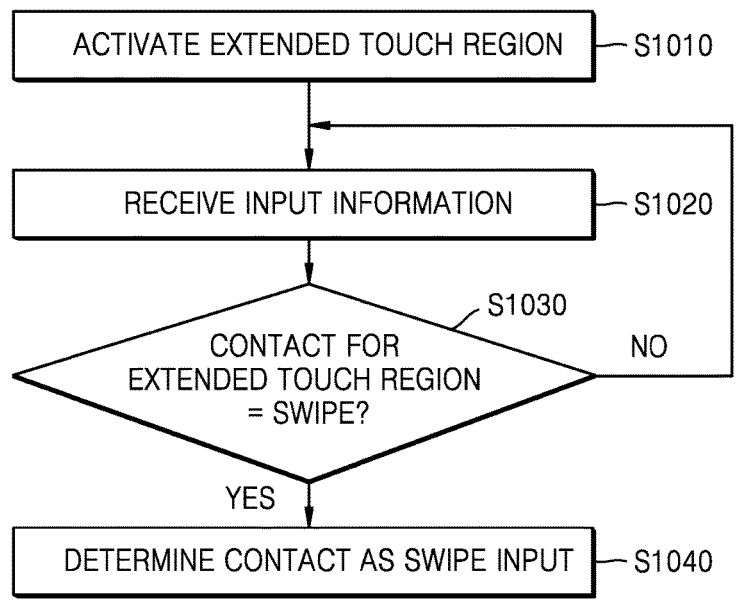
FIG. 10 is a flowchart of a touch input method according to an embodiment of the present disclosure.

FIG. 10 is a flowchart of a touch input operation according to an embodiment of the present disclosure.

In operation S1010, the terminal 300 may determine the extended touch region 150, and the determined extended touch region 150 may be disposed in or near the first body part 100. Also, the terminal 300 may stand by for contact of the second body part 200 and activate the extended touch region 150. An operation of determining the extended touch region 150 is described above in detail, and thus, its detailed description is not repeated.

In operation S1020, the contact sensing unit 330 of the terminal 300 may sense that the first body part 100 is brought in contact with the second body part 200 of a user in the extended touch region 150 and may receive contact sensing information as input information for controlling the terminal 300.

In operation S1030, the controller of the terminal 300 may determine whether contact of the second body part 200 with the extended touch region 150 is a swipe (or swype), based on a measurement value measured by the distance measurement unit 320 of the terminal 300 and a distance between the terminal 300 and the second body part 200 which is sensed by the contact sensing unit 330 of the terminal 300.

In operation S1040, when it is determined by the terminal 300 that the contact of the second body part 200 with the first body part 100 in the extended touch region 150 is a swipe, the terminal 300 may determine the contact as a swipe input for the terminal 300. Therefore, the terminal 300 may change a program which is being executed in the terminal 300 or may turn up the volume, based on the swipe input.

Figure 11A:
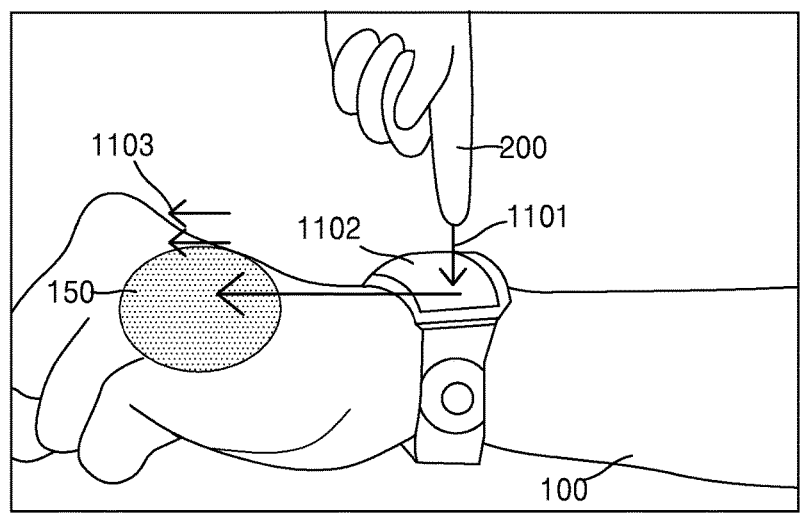
FIGS. 11A and 11B are diagrams of touch input methods according to embodiments of the present disclosure.
Figure 11B:
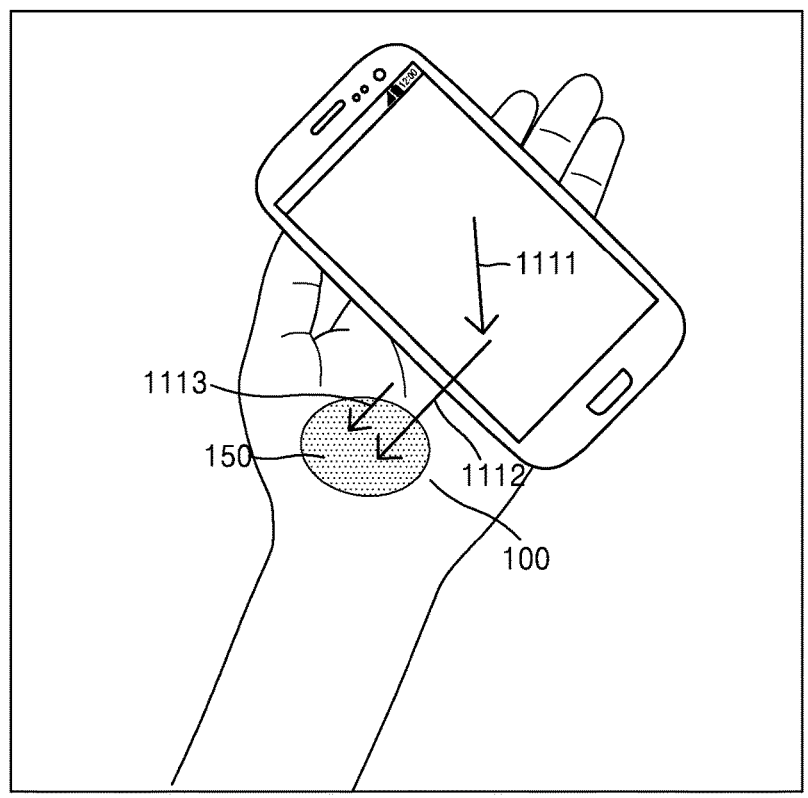

FIGS. 11A and 11B are diagrams of touch input methods according to embodiments of the present disclosure.

The click input described above with reference to FIG. 9 and the swipe input described above with reference to FIG. 11 are different in that the swipe input enables a continuous adjustment value to be input. A desired touch input may be changed depending on a type of an application which is being executed by the terminal 300, and a large changed value may be input at a time. For example, when a music reproduction application is being executed by the terminal 300, the large changed value may be input at a time according to a swipe input. When there are a minimum value and a maximum value as in an input for adjusting brightness of the terminal 300, the swipe input may be a touch input which is intuitive and easy for the user. Therefore, when a touch input of the user is received through the extended touch region 150, the terminal 300 may determine the touch input as an input suitable for the user's intention, based on an application executed by the terminal 300, and the terminal performs the control function.

Referring to FIG. 11A, a user wears a watch type terminal 300 on a left wrist and touches the terminal 300 with a right hand forefinger. Activating an extended touch region 150 is described above in detail with reference to FIGS. 9A and 9B, and thus, its detailed description is not repeated.

The terminal 300 may receive a touch input from 1101 a user and then may receive a swipe touch input 1102 through the extended touch region 150. Subsequently, the contact sensing unit 330 of the terminal 300 may sense a swipe contact 1103 which is made on a back of a left hand in the extended touch region 150 by using a right hand forefinger of the user, and the terminal 300 may receive sensed contact information as input information for controlling the terminal 300. The controller of the terminal 300 may determine contact of the right hand forefinger with the extended touch region 150 as a swipe touch, based on a measurement value measured by the distance measurement unit 320 of the terminal 300 and a distance between the terminal 300 and the second body part 200 sensed by the contact sensing unit 330 of the terminal 300. Therefore, the terminal 300 may determine the contact of the right hand forefinger as a swipe input for the terminal 300. That is, the terminal 300 may determine the contact of the right hand forefinger as a swipe input which selects an object displayed on a screen. Therefore, the terminal 300 may change the screen of the terminal 300 or scroll content displayed on the screen.

For example, when a background screen of the terminal 300 is being displayed, the terminal 300 may receive a continuous swipe touch input, which is applied to the back of the left hand corresponding to the extended touch region 150 and the touch screen by using the right hand forefinger, from the user and change a reproduction list displayed on a screen, based on the continuous swipe touch input. After the reproduction list displayed on the screen is changed, when the contact sensing unit 330 senses a continuous touch applied to the back of the left hand which is the extended touch region 150, the terminal 300 may determine the continuous touch as a swipe input for the terminal 150 and change the background displayed on the screen.

Referring to FIG. 11B, a smartphone terminal 300 is located on the fingers of the left hand of a user and the user touches the terminal 300 with a right hand forefinger as described above with reference to FIG. 9B.

For example, when a news view application is being executed by the terminal 300, the terminal 300 may receive a continuous swipe touch input, which is applied to a left hand palm corresponding to the extended touch region 150 and the touch screen by using a right hand forefinger, from the user and may scroll news information displayed on a screen upward/downward, based on the continuous swipe touch input. After the news information displayed on the screen is scrolled, when the contact sensing unit 330 of the terminal 300 senses a swipe touch applied to a left hand which is the extended touch region 150, the terminal 300 may determine the swipe touch as a swipe input for the terminal 300 and may continuously scroll news information displayed on the screen.

An input of the present disclosure may be modified and applied to the extended touch region 150 for the terminal 300. The present disclosure may be applied to a plurality of users. When there are a first user and a second user, the first user may wear a terminal (hereinafter, a first user terminal), and the first user terminal may be controlled according to a touch input applied to a first user terminal of the second user. In this case, the first user and the second user may be in a state where the first user is physically brought in contact with the second user, and the state may be a state which enables the swept frequency capacitive sensing scheme or the human body communication scheme to be applied. For example, when a smartwatch is worn on a left wrist of the first user and a left hand of the first user holds a left hand of the second user, the smartwatch which is the first user terminal may be controlled according to a swipe input, which is applied to the smartwatch by a right hand forefinger of the second user, and a user touch subsequent thereto. This is because there are actually a plurality of users, but since the plurality of users are physically brought in contact with each other, a terminal determines a main agent of a touch input as one user.

Figure 12:
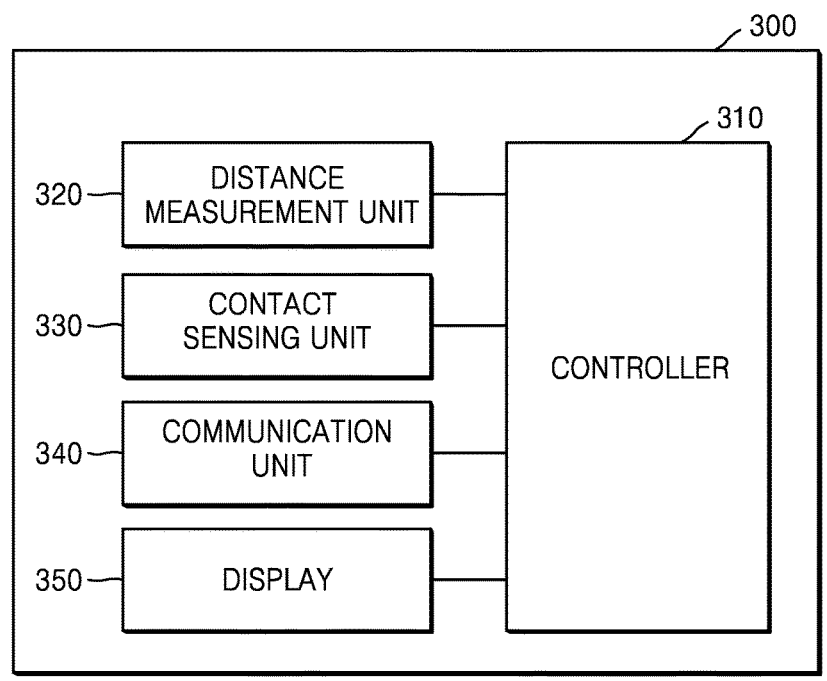
FIG. 12 is a block diagram of a terminal according to an embodiment of the present disclosure.

FIG. 12 is a block diagram of a terminal 300 according to an embodiment of the present disclosure.

The terminal 300 according to the present disclosure is a wearable device. Referring to FIG. 12, the terminal 300 may include a controller 310, a distance measurement unit 320, a contact sensing unit 330, a communication unit 340, and a display 350. The terminal 300 may further include an input unit and storage.

The controller 310 may process an input signal received by the terminal 300 to control an operation of the terminal 300. For example, the controller 310 may determine whether a distance to the terminal 300 increases and in which direction the distance increases, based on changes in values measured by the distance measurement unit 320. Alternatively, the controller 300 may determine whether a multi-touch is applied and a swipe is made by the first body part 100 and the second body part 200, based on a type of a contact sensed by the contact sensing unit 330.

The distance measurement unit 320 may measure a distance between the terminal 300 and an object. The distance measurement unit 320 of the terminal 300 may measure a linear distance (e.g. a minimum distance) between the object and a boundary where the distance measurement unit 320 is disposed, and for example, the distance measurement unit 320 may measure the distance between the terminal 300 and the object by using an ultrasound distance sensor or an infrared distance sensor.

The contact sensing unit 330 may sense whether the terminal 300 is brought in contact with a body of a user. The contact sensing unit 330 may be disposed at a portion of the terminal 300 which is physically brought in contact with the body of the user. The contact sensing unit 330 may acquire contact information by using a swept frequency capacitive sensing scheme or a human body communication scheme.

The communication unit 340 may receive an application execution command from an external device connected to the terminal 300. Examples of an external device may include a portable terminal, a smartphone, a notebook computer, a laptop computer, a tablet personal computer (PC), an e-book terminal, a digital broadcasting terminal, a personal digital assistant (PDA), a portable multimedia player (PMP), a navigation device, a moving picture experts group audio layer 3 (MP3) player, and/or the like, but are not limited thereto. For example, a user may request execution of an application installed in the terminal 300 by using a portable terminal, a smartphone, a notebook computer, a table PC, a navigation device, or the like connected to the terminal 300. The external device may transmit an application execution command to the terminal 300 through a short-distance communication (for example, Bluetooth, near field communication (NFC), wireless fidelity direct (WFD), or the like).

The display 350 may display a screen for a program which is being executed by the terminal 300. The display 350 may include an image display panel such as a liquid crystal panel, an organic light emitting panel, or the like and may display a graphic of a UI that represents a function setting, a software application, or content such as music, a photograph, a video, or the like.

An input unit may receive an input such as a touch input, a button input, a pen input, or the like of the user which is applied by the user manipulating the terminal 300. When the input is the touch input, the touch input may be input through a touch screen of the display 350.

Signals input externally may be converted into the form of data, and storage may store the converted data. A measurement value measured by the distance measurement unit 320 and contact information sensed by the contact sensing unit 330 may be converted into the form of data, and the storage may store the converted data. The storage may store data which is transmitted from an external device or a server and is received through the communication unit 340.

In digital devices that perform various functions, a user environment (UI/UX) is an important issue. For example, since conventional televisions (TVs) are being replaced with smart TVs, the ability of a user to conveniently use various functions provided by a smart TV is one of the important issues when the smart TV is located in a living room of a person's home. Smart TVs may provide various pieces of Internet-based content, which is provided by general PCs, such as Internet web surfing, e-mail, games, photographs, music, video media, and/or the like, in addition to broadcast content. However, when a user feels uncomfortable because various pieces of content are provided, the utility of smart TVs is reduced. Therefore, a GUI providing an apparatus and a method according to an embodiment of the present disclosure may be applied to multimedia apparatuses such as smart TVs and/or the like, and thus, a user's convenience is enhanced.

The present disclosure may also be embodied as processor readable code on a non-transitory computer readable recording medium included in a digital device such as a central processing unit (CPU). A non-transitory computer readable recording medium is any data storage device that may store data which may be thereafter read by a computer system. Examples of a non-transitory computer-readable recording medium include read-only memory (ROM), random-access memory (RAM), compact disc ROMs (CD-ROMs), magnetic tapes, floppy disks, and optical data storage devices. The non-transitory computer readable recording medium may also be distributed over network coupled computer systems so that the computer readable code may be stored and executed in a distributed fashion. Also, functional programs, code, and code segments for implementing the method of providing a GUI may be easily construed by programmers of ordinary skill in the art to which the present disclosure pertains.

According to an embodiment of the present disclosure, a portable terminal is easily controlled by extending a touch input part with a human body.

It should be understood that embodiments of the present disclosure described herein should be considered in a descriptive sense only and not for purposes of limitation.

Descriptions of features or aspects within each embodiment of the present disclosure should typically be considered as being available for other similar features or aspects in other embodiments of the present disclosure.

While one or more embodiments of the present disclosure have been described with reference to the accompanying drawings, it will be understood by those of ordinary skill in the art that various changes in form and details may be made therein without departing from the scope and spirit of the present disclosure as defined by the appended claims and their equivalents.

What is claimed is:

1. A touch input method, comprising:
receiving, by a terminal contacting a first body part, a touch input applied to an extended touch region of the first body part by a second body part;
measuring a distance between the terminal and the second body part;
sensing, by the terminal, whether the second body part contacts the first body part by sensing a changed value of an electrical signal, transmitted through the first body part from the terminal and received by the terminal;
acquiring, by the terminal, contact information of the touch input between the first body part and the second body part based on the changed value of the electrical signal; and
determining a type of the touch input, based on the measured distance between the terminal and the second body part and the contact information between the first body part and the second body part,
wherein the extended touch region of the first body part locates near an area contacting the terminal,
wherein the value of the electrical signal is changed by the contact between the first body part and the second body part,
wherein the contact information includes at least one of a contact time, a contact region, a contact material, and a number of contacts, and
wherein the type of the touch input includes at least one or a combination of a single-touch input, a multi-touch input, a swipe touch input, a continuous touch input, a long press input, and a pinch-to-zoom input.

2. The touch input method of claim 1, wherein the distance between the terminal and the second body part is a smallest distance from a side boundary of the terminal to the second body part.

3. The touch input method of claim 1, wherein sensing, by the terminal, whether the second body part contacts the first body part comprises using swept frequency capacitive sensing.

4. The touch input method of claim 1, wherein sensing, by the terminal, whether the second body part contacts the first body part comprises using conductivity of a body of a user.

5. The touch input method of claim 1, wherein sensing, by the terminal, whether the second body part contacts the first body part comprises sensing for a certain time period after the terminal receives the touch input applied by the second body part.

6. The touch input method of claim 1, further comprising controlling a program which is being executed by the terminal, based on the touch input.

7. The touch input method of claim 1, wherein the first body part and the second body part are different body parts of a user.

8. The touch input method of claim 1, wherein
the first body part is a body part of a first user,
the second body part is a body part of a second user, and
the first user is in physical contact with the second user.

9. A terminal contacting a first body part, comprising:
an input unit configured to receive a touch input applied to an extended touch region of the first body part by a second body part;
a distance measurement unit configured to measure a distance between the terminal and the second body part;
a contact sensing unit configured to sense whether the second body part contacts the first body part by sensing a changed value of an electrical signal, transmitted through the first body part form the terminal and received by the terminal, and acquire contact information between the first body part and the second body part based on the changed value of the electrical signal; and
a controller configured to determine a type of the touch input, based on the measured distance between the terminal and the second body part and the contact information between the first body part and the second body part,
wherein the extended touch region of the first body part locates near an area contacting the terminal,
wherein the value of the electrical signal is changed by the contact between the first body part and the second body part,
wherein the contact information includes at least one of a contact time, a contact region, a contact material, and a number of contacts, and
wherein the type of the touch input includes at least one or a combination of a single-touch input, a multi-touch input, a swipe touch input, a continuous touch input, a long press input, and a pinch-to-zoom input.

10. The terminal of claim 9, wherein the distance between the terminal and the second body part is a smallest distance from a side boundary of the terminal to the second body part.

11. The terminal of claim 9, wherein the contact sensing unit is further configured to sense whether the second body part contacts the first body part by using swept frequency capacitive sensing.

12. The terminal of claim 9, wherein the contact sensing unit is further configured to sense whether the second body part contacts the first body part by using a human body communication scheme.

13. The terminal of claim 9, wherein the contact sensing unit is further configured to sense, for a certain time period after the terminal receives the touch input applied by the second body part, whether the second body part contacts the first body part.

14. The terminal of claim 9, wherein the terminal is configured to control a program which is being executed by the terminal, based on the touch input.

15. The terminal of claim 9, wherein the first body part and the second body part are different body parts of a user.

16. The terminal of claim 9, wherein
the first body part is a body part of a first user,
the second body part is a body part of a second user, and
the first user is in physical contact with the second user.

17. A non-transitory computer-readable storage medium storing a program, which when executed by a computer, performs a touch input method in connection with hardware, wherein the touch input method comprises:
receiving, by a terminal contacting a first body part, a touch input applied to an extended touch region of the first body part by a second body part;

measuring a distance between the terminal and the second body part;

sensing, by the terminal, whether the second body part contacts the first body part by sensing a changed value of an electrical signal, transmitted through the first body part from the terminal and received by the terminal;

acquiring, by the terminal, contact information between the first body part and the second body part based on the changed value of the electrical signal; and determining a type of the touch input, based on the measured distance between the terminal and the second body part and the contact information between the first body part and the second body part, wherein the extended touch region of the first body part locates near an area contacting the terminal, wherein the value of the electrical signal is changed by the contact between the first body part and the second body part, wherein the contact information includes at least one of a contact time, a contact region, a contact material, and a number of contacts, and wherein the type of the touch input includes at least one or a combination of a single-touch input, a multi-touch input, a swipe touch input, a continuous touch input, a long press input, and a pinch-to-zoom input.

18. A chipset for touch input, configured to:

receive, by a terminal contacting a first body part, a touch input applied to an extended touch region of the first body part by a second body part;

measure a distance between the terminal and the second body part;

sense, by the terminal, whether the second body part contacts the first body part by sensing a changed value of an electrical signal, transmitted through the first body part from the terminal and received by the terminal;

acquire, by the terminal, contact information between the first body part and the second body part based on the changed value of the received electrical signal; and determine a type of the touch input, based on the measured distance between the terminal and the second body part and the contact information between the first body part and the second body part, wherein the extended touch region of the first body part locates near an area contacting the terminal, wherein the value of the electrical signal is changed by the contact between the first body part and the second body part, wherein the contact information includes at least one of a contact time, a contact region, a contact material, and a number of contacts, and wherein the type of the touch input includes at least one or a combination of a single-touch input, a multi-touch input, a swipe touch input, a continuous touch input, a long press input, and a pinch-to-zoom input.

19. The chipset of claim 18, wherein the distance between the terminal and the second body part is a smallest distance from a side boundary of the terminal to the second body part.

20. The chipset of claim 18, wherein sensing, by the terminal, whether the second body part contacts the first body part comprises using swept frequency capacitive sensing.

* * * * *